United States Patent
Wong

(10) Patent No.: US 6,916,032 B2
(45) Date of Patent: Jul. 12, 2005

(54) MANUALLY-PROPELLED VEHICLE AND RELATED SYSTEMS

(75) Inventor: Sui-Kay Wong, North Point (HK)

(73) Assignee: J.T. Labs, Ltd., Hong Kong (HK)

( * ) Notice: Subject to any disclaimer, the term of this patent is extended or adjusted under 35 U.S.C. 154(b) by 1 day.

(21) Appl. No.: 10/618,832

(22) Filed: Jul. 14, 2003

(65) Prior Publication Data

US 2004/0051272 A1 Mar. 18, 2004

Related U.S. Application Data

(60) Provisional application No. 60/401,061, filed on Aug. 5, 2002.

(51) Int. Cl.$^7$ ................................................. B62M 1/00
(52) U.S. Cl. ..................... 280/244; 280/242.1; 280/250
(58) Field of Search ............................. 280/244, 250.1, 280/253, 647, 252, 255, 259, 263, 264, 47.17, 771, 246, 243, 242.1

(56) References Cited

U.S. PATENT DOCUMENTS

| | | | |
|---|---|---|---|
| 4,453,729 A | * 6/1984 | Lucken .................. 280/250.1 |
| 4,560,181 A | * 12/1985 | Herron .................. 280/250.1 |
| 4,762,332 A | * 8/1988 | Seol .................... 280/250.1 |
| 4,811,964 A | 3/1989 | Horn | |
| 5,020,815 A | * 6/1991 | Harris et al. ............ 280/246 |
| 5,263,729 A | * 11/1993 | Watwood et al. ......... 280/246 |
| 5,280,937 A | * 1/1994 | Needham ................ 280/259 |
| 5,303,945 A | * 4/1994 | Oxford ................. 280/304.1 |
| 5,865,455 A | * 2/1999 | Taylor ................. 280/250.1 |
| 6,007,082 A | * 12/1999 | Watwood et al. ......... 280/244 |
| 6,158,757 A | * 12/2000 | Tidcomb ............... 280/250.1 |
| 6,173,986 B1 | * 1/2001 | Sicher .................. 280/647 |
| 6,224,078 B1 | * 5/2001 | Tidcomb ............... 280/250.1 |
| 6,471,231 B1 | * 10/2002 | Hargroder ............ 280/304.1 |
| 2002/0153691 A1 | * 10/2002 | Liao et al. ............ 280/250.1 |
| 2003/0025292 A1 | * 2/2003 | Hargroder ............ 280/250.1 |

FOREIGN PATENT DOCUMENTS

FR 2561610 3/1989
JP 2000333998 12/2002

* cited by examiner

Primary Examiner—Tony Winner
(74) Attorney, Agent, or Firm—Kevin J. McGough

(57) ABSTRACT

The invention provides a propulsion, braking and anti-rollback control assembly for use in manually propelled vehicles such as wheelchairs. In one embodiment, the invention provides a wheelchair with a control lever assembly and related force conveyance connecter that propel, brake and steer the wheelchair in a mechanically advantageous way while minimizing rollback. A seat-activated auxiliary braking system is also provided. Additionally, the invention provides a selective anti-rollback disengagement system that facilitates selective rollback.

19 Claims, 5 Drawing Sheets

US 6,916,032 B2

MANUALLY-PROPELLED VEHICLE AND RELATED SYSTEMS

RELATED APPLICATIONS

The instant application claims priority from U.S. Provisional Patent Application Ser. No. 60/401,061, filed Aug. 5, 2002.

FIELD OF THE INVENTION

The invention provides a propulsion, braking, anti-rollback and control assembly for use in manually propelled vehicles such as wheelchairs. In one embodiment, the invention provides a control lever assembly, a seat-actuated auxiliary braking system and related force conveyance system that propel, brake and steer a wheelchair in a safe and mechanically advantageous way while minimizing vehicle rollback. Additionally, the invention provides a selective anti-rollback disengagement system that facilitates selective and controlled rearward movement in situations where some vehicle rollback is desired.

BACKGROUND OF THE INVENTION

Almost all wheelchairs include rear wheel locks that prevent the chair from rolling when an occupant either attempts to sit in or rise from the chair. Because the frail physical or mental state of many occupants often prevents them from engaging such locks, many wheelchairs also employ anti-rollback apparatus. Anti-rollback apparatus prevent unintended rearward chair motion when the occupant is either attempting to get in and out of the chair or propel it uphill. Anti-rollback apparatus include clutch and rack and pinion systems such as those described in U.S. Pat. Nos. 6,371,503; 6,347,1088; 6,203,041; and 4,538,825.

There are times, however, when an occupant, in order to best maneuver a wheelchair, needs to be able to move the wheelchair backwards. Entering and exiting a lift is one example of a situation where selective disengagement of an anti-rollback apparatus would be desirable.

It still proves difficult to propel a manually propelled wheelchair up an incline even if the chair is equipped with an anti-rollback device. The occupant must generate sufficient force to propel the combined weight of the occupant plus the chair up the incline by accelerating through rapid rotation of drive wheels using two hands. Not all occupants are strong enough to do so, nor is it safe or convenient for an occupant to occupy both hands solely to propel the chair. Some wheelchair occupants may have lost the use of a hand and therefore are limited in the power they can generate. Even if a occupant is strong enough to propel the wheelchair a substantial distance up an incline, the inherent mechanical disadvantages of current chair designs prevent the efficient translation of linear acceleration force to upward propulsive force along the incline. Thus, the chair may roll backwards, even if equipped with anti-rollback means.

Braking while descending an incline is another problem. Current wheelchair designs rely on wheel-mounted brakes to slow the chair as it descends along an incline, and these too can prove ineffective in slowing the chair to a safe speed. These systems may require an occupant to divert his attention from steering the chair and require him to shift his hand or hands from a steering device to a braking device. The wheelchair is left temporarily uncontrolled during the dangerous descent period.

While motorized wheelchairs solve these problems to an extent, many users cannot afford such chairs. There is therefore the need to provide a means of single handedly propelling, steering and braking a manually propelled wheelchair to afford safe transportation to those who cannot afford or do not have access to motorized wheelchairs. A solution to the aforementioned problems would apply equally to any number of manually propelled vehicles, including carts and toy cars. While occupants of such vehicles may not be handicapped or infirm, they nonetheless might lack the dexterity and strength to propel, brake and steer the vehicle.

OBJECTS OF THE INVENTION

It is an object of the instant invention to provide an improved manually propelled vehicle and an improved control assembly for use in such vehicle.

It is another object of the instant invention to provide an improved manually propelled vehicle such as a wheelchair that provides for single handed steering, propulsion, braking and minimum rollback.

It is another object of the present invention to provide an improved manually propelled vehicle such as a wheelchair that provides for single-handed steering, propulsion and braking and selective rollback.

It is another object of the present invention to provide an improved manually propelled vehicle such as a wheelchair which provides for single handed steering, propulsion and braking, which facilitates selective rollback, and which provides a seat activated auxiliary drive wheel braking system.

SUMMARY OF THE INVENTION

In accordance with the above-stated objects, the instant invention provides an improved manually propelled vehicle such as a wheelchair that enables single handed steering, propulsion and braking, which facilitates selective rollback, and which provides a seat activated auxiliary drive wheel braking system.

The invention includes a novel control apparatus comprised of a control lever assembly that steers, propels and brakes the vehicle and that enhances anti-rollback. The invention also provides an auxiliary braking system actuated by a vehicle occupant through shifting of the vehicle seat along a supporting frame. Additionally, the invention in one embodiment comprises a system that facilitates selective rollback. The systems and apparatus of the instant invention prove particularly useful for wheelchair applications.

In one embodiment of the instant invention, a wheelchair is comprised of a frame, a front steering wheel assembly having at least two pivoting steering wheels connected to steering wheel shafts and a rear drive wheel assembly comprising at least one drive wheel mounted on a rear drive wheel shaft. The rear drive wheel assembly also includes a wheel locking mechanism or anti-rollback apparatus and a single direction engagement apparatus, both of which are axially mounted on the rear drive wheel shaft. The front steering and rear drive wheel assemblies support the frame and enable movement of the vehicle. An adjustable footrest is positioned horizontally within the frame above the front steering wheel assembly, and the front steering wheel shafts are pivotally attached to the bottom of the footrest. A seat constructed and oriented to support an occupant is also provided and the seat is mounted for limited horizontal sliding motion (for example, a few inches) on the frame through known means such as roller and rail or linear bearing connection systems. The seat is connected by means such as a lever engaged to a frictional pad to brake the drive wheel or by a hydraulic brake actuator linked to a rear drive wheel brake actuation system whereby movement of the seat in a forward direction actuates the braking system.

The wheelchair has a control apparatus comprised of a control lever assembly having a plurality of engagement sites, such as grooved apertures, that extend along the length of the control lever assembly. The control lever assembly is pivotally affixed at its bottom end to the top of the footrest for limited forward and backwards movement along the pivot axis from a vertical orientation. A sleeve is disposed for movement on the exterior of the control lever assembly and a plurality of engagement sites, e.g., grooved apertures, extend along the length of the sleeve; these may be positioned to overlap one or more of the engagement sites of the control lever assembly. The control lever assembly is connected by a standard brake actuating system (e.g., a hydraulic brake actuating system) to a drive wheel braking system including a braking disc axially mounted on the rear drive wheel shaft. A force conveyance connecter such as a rigid rod, cable or chain is connected at one end to a single direction engagement means such as a single direction rotating disc axially mounted on the drive wheel shaft and is affixed at the other end to the sleeve. When engaged, the single direction engagement apparatus contributes to anti-rollback.

In one embodiment, the force conveyance connecter is connected to a single direction rotating disc which is axially mounted on the rear drive wheel shaft and which has a ratchet-claw mechanism that engages the rear drive wheel shaft for propulsion and ensures single direction movement. Engagement of the ratchet by the claw ensures single direction rotation. The axially mounted single direction rotating disc is also connected elastically, e.g., by a spring, to the frame to delimit disc rotation. In one embodiment, the wheel locking mechanism or anti-rollback apparatus comprises a circumferentially apertured disc axially mounted on the drive wheel shaft and locked in position through connection with a retractable locking pin mounted on the frame for connection with a disc aperture. In another embodiment, the single direction engagement apparatus is a single direction ratchet mounted for engagement on the rear drive wheel shaft. Those skilled in the art will appreciate that other varieties of single direction engagement apparatus and force conveyance connectors may be employed.

The control apparatus further comprises a rotating steering column that (i) extends through and is disposed for movement within the control lever assembly, and (ii) that engages for turning and steering by a flexible joint or universal joint one of the front steering wheel shafts. The steering column includes an engager, e.g. a location pin, which may, through movement of the steering column, be positioned to engage simultaneously an engagement site (say a grooved aperture) of both the sleeve and control lever assembly and thereby lock the sleeve at a fixed position along the control lever assembly. The steering column may be used to turn and steer the front steering wheel(s) at the same time and has a handle for convenient engagement by the chair occupant.

The control lever assembly may be used to propel the vehicle as follows. An occupant manipulates the steering column handle to adjust the sleeve and hence the force conveyance connecter to a position advantageous for propulsion in the given circumstance. The occupant will determine the most advantageous position intuitively by noticing the resistance he encounters as he propels the vehicle. The occupant pushes the control lever assembly in a forward direction from a vertical orientation by manipulation of the steering column, thereby conveying a propulsive force through the force conveyance connecter which causes the single direction engagement apparatus and hence the drive wheel shaft to rotate in a forward direction. For example, where the single direction engagement apparatus is a disc, when the control lever assembly is pushed forward, the disc rotates in a forward direction to an extent delimited by the tension exerted on the single direction rotating disc by an elastic connection such as a spring, thereby translating forward propulsive force to rear drive wheel shaft. The most efficient translation of propulsive force occurs when the steering column is adjusted to lock the sleeve in a position along the control lever assembly closest to the footrest, e.g. closest to a pivot mounting the control lever assembly on the frame. Both the wheel locking mechanism or anti-rollback and single direction engagement apparatus assist in preventing rear drive wheel rollback.

The control apparatus of the instant invention when used in combination with known wheel locking mechanism or anti-rollback mechanisms provides a mechanical advantage up to ten times or more in the translation to the drive wheel shaft of a propulsive force exerted by the occupant by pushing the control lever assembly in a forward direction.

The control lever assembly may be used to brake the vehicle as follows. As mentioned, the control lever assembly is connected by a standard brake actuating device and linkage (e.g., a hydraulic brake actuating system) to a drive wheel braking system including a braking disc axially mounted on the rear drive wheel shaft. Pulling the control lever assembly back from a vertical orientation actuates the brake actuating device and causes the braking disc to engage the drive wheel shaft.

The auxiliary braking system is actuated by shifting the seat forward, either through an occupant's weight shifting or through force of gravity in downhill motion, as follows. In one example, the top end of a lever pivotally mounted on the frame engages the bottom of the seat by a flexible or rigid link. As the seat slides forward along the frame, seat movement causes the lever to pivot and engages or disengages contact between braking pads rotationally mounted on the bottom of the lever and the rear drive wheel. Thus, by forward seat shifting, additional braking is applied to the rear driving wheel during down hill motion. Because the auxiliary braking system can be engaged by mere force of gravity, an occupant's hands are freed for steering during downhill motion.

The wheel locking mechanism or anti-rollback disengagement system of the instant invention comprises a handle mounted on either the frame or control lever assembly. The handle is connected by a disengagement cable in a manner that enables the engagement and disengagement of either or both of the wheel locking mechanism or anti-rollback and single direction engagement apparatus. For example, in the aforementioned example of disc single direction engagement and wheel locking mechanism or anti-rollback apparatus the disengagement cable may disengage the anti-rollback locking pin and the claw of the claw and ratchet mechanism, thereby permitting the mechanism to rotate to a limited extent in either direction.

Each of the aforementioned features of the instant invention may be used in synergistic combination to provide safe and effective vehicle transportation under varying modes of operation.

DETAILED DESCRIPTION OF THE INVENTION

The following detailed description relates to a wheelchair employing the control assembly, seat-activated auxiliary braking system and wheel locking mechanism or anti-rollback disengagement system of the instant invention. Manually propelled vehicles, e.g., toy carts or cars, golf carts or other recreational vehicles, manually propelled devices for security personnel or work vehicles such as messenger carts used in factory environments, can also employ these systems or assemblies and are also within the scope of this invention.

A wide variety of components may be used in the control assembly, seat-activated auxiliary braking system and wheel locking mechanism or anti-rollback disengagement systems illustrated hereinafter. For example, the illustrated pin-locked axially mounted wheel locking mechanism or anti-rollback apparatus is just one of a variety of wheel locking mechanism or anti-rollback apparatus which could be employed. The force conveyance connecter can take any number of forms such as a wire, cable, chain or rod capable of withstanding the propulsive and wheel locking or anti-rollback stresses associated with the operation of an occupied vehicle such as a wheelchair. The engagement sites and engager could be detents and grooves or other suitable engagers. The control lever assembly can be connected to actuate a rear drive wheel braking system by a variety of known brake actuation systems including hydraulic systems. The seat-activated auxiliary braking system includes the lever and hydraulic systems illustrated hereinafter as well as other components apparent to those of skill in the art.

In one embodiment, the force conveyance connecter is a chain that engages the teeth of axially mounted single direction sprocket. In another embodiment, the force conveyance connecter is a cable that can be welded, soldered or screwed or fastened in any number of other possible ways to a single direction engagement apparatus. The instant invention therefore includes any number of combinations of force conveyance connecters, single direction engagement apparatus and axially mounted wheel locking mechanism or anti-rollback apparatus and the adaptation of these discrete components to the vehicles and systems of the instant invention will be apparent to those of skill in the art. For example, standard clutch, gear or rack and pinion systems may be modified or adapted for use in the systems and vehicles of the instant invention.

Figure 1:
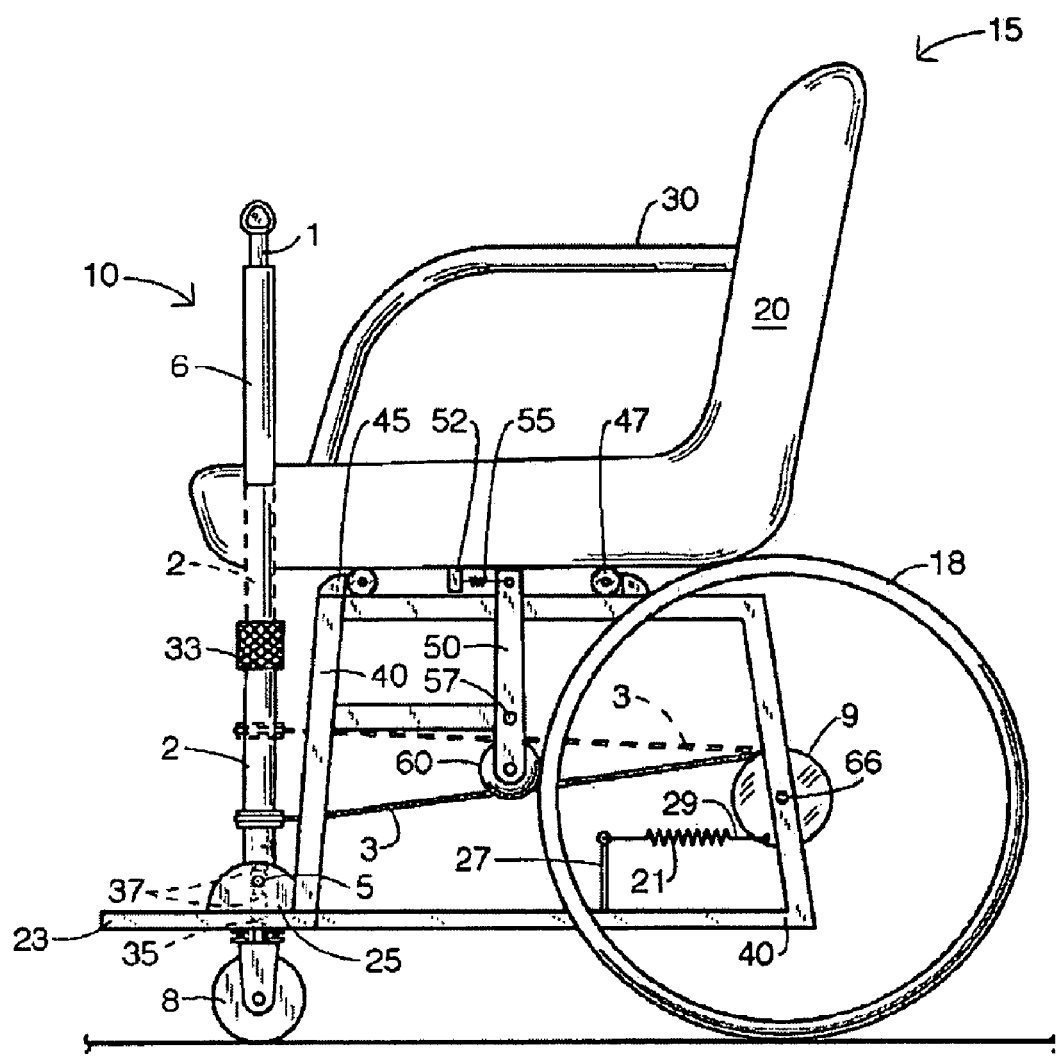
FIG. 1 illustrates a side view of a wheelchair that utilizes a control assembly of the instant invention and depicts the interrelationship of the control lever assembly and seat-activated auxiliary braking system.

Referring to FIG. 1, a wheelchair 15 comprises a frame 40, a front steering wheel assembly comprising at least two pivoting steering wheels such as steering wheel 8 connected by steering wheel shafts 35 to the bottom of footrest 23 and at least one rear wheel(s) mounted on shaft 66; at least one rear wheel is a drive wheel such as rear drive wheel 18. Single direction engagement apparatus 9 in the form of a rotating disc is axially mounted on shaft 66 for engagement in a manner described hereinafter in the discussion of FIGS. 4 and 5. Seat 20 with armrest 30 is mounted on wheels 47 for slidable movement along rails 45 on top of frame 40. Brake lever 50 is pivotally mounted at pivot point 57 to frame 40 and is engaged at its top end by spring 55 to connecter 52 affixed to the bottom of seat 20. Brake lever 50 has braking pads 60 rotatably affixed at the bottom end for engagement with rear driving wheel 18. Thus, as seat 20 shifts forward during downhill motion, brake lever 50 pivots to engage pads 60 into contact with the drive wheel 18. An adjustable footrest 23 is positioned horizontally within frame 40 and is connected to front steering wheel shafts 35.

The wheelchair has a control assembly comprising control lever assembly 10 mounted on frame 40 near footrest 23 through rotating connection with pivot 25 mounted on frame 40. (Further details of control lever assembly 10 are described hereinafter in the discussion of FIG. 2.) As shown in FIG. 1, control lever assembly 10 comprises steering column 1 and sleeve 2 and is connected to force conveyance connecter 3 (which is a cable in FIG. 1). Control lever assembly 10 is affixed to pivot in a forwards and rearwards direction by pivot 25. Steering column 1 is disposed for movement within control lever assembly 10 and, as discussed hereinafter in the description of FIG. 2, steering column 1 is flexibly affixed at its bottom end to a front steering wheel shaft 35 through a flexible or universal joint. Flexible connection of steering column 1 to front steering wheel shaft 35 enables the steering column 1 to move within control lever assembly 10 while still maintaining a connection with front steering wheel 8. Sleeve 2 is disposed for movement along, and may be affixed by manipulation of steering column 1, at various positions along control lever assembly 10 (as described in detail hereinafter in the discussion of FIG. 2). Force conveyance connecter 3 engages axially mounted single direction rotating disc 9 at one end and sleeve 2 at the other end. Axially mounted single direction rotating disc 9 is connected to frame 40, fastener 29, spring 21 and fastener 27. Fasteners 27 and 29 can be any standard fastening means such as a screw, bolt, weld or clip.

The wheelchair occupant can steer, brake and propel the wheelchair 15 by pushing or pulling control lever assembly 10 by manipulating steering column 1. Steering column 1 may be manipulated to move sleeve 2, and hence force conveyance connecter 3, along control lever assembly 10 to engage sleeve 2 and force conveyance connecter 3 at various positions along control lever assembly 10. An increasing propulsive force is exerted by force conveyance connecter 3 through single direction rotating disc 9 to the drive wheel shaft 66 as steering column 1 is adjusted to lock sleeve 2 in a position along the control lever assembly 10 closer to pivot 25.

Figure 2:
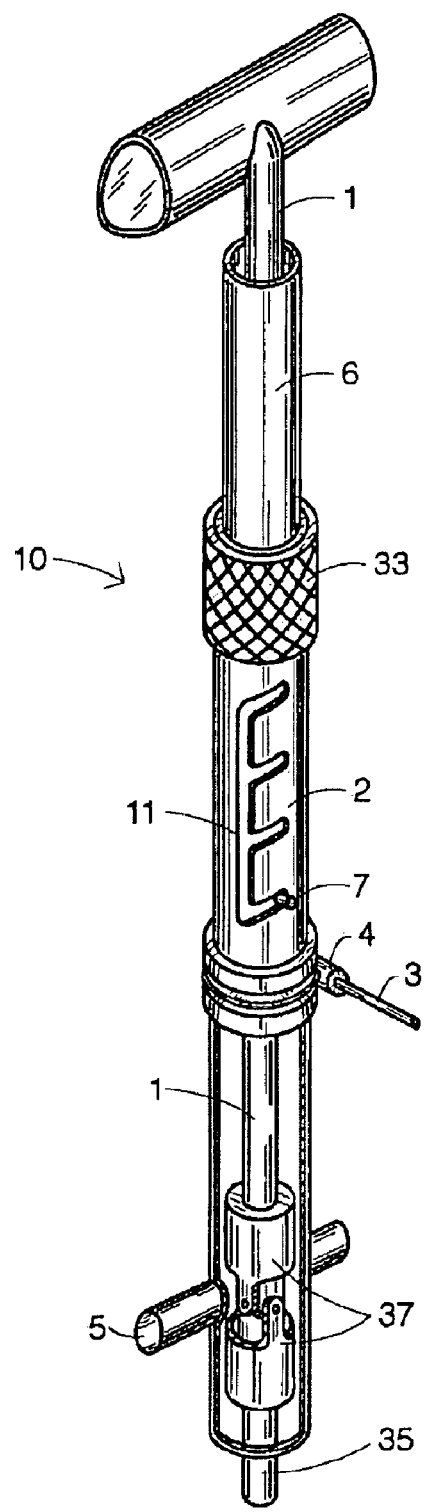
FIG. 2 illustrates a perspective view of the control lever assembly, sleeve and steering column. It also illustrates connection of the control lever assembly to a pivot and the connection of the steering column to a drive wheel shaft through a flexible joint.

Referring to FIG. 2, control lever assembly 10 has a plurality of grooved apertures 11 which extend along the length of control lever assembly 10. Control lever assembly 10 is affixed at its bottom end to pivot 25 comprising lever pivot 5 which enables control lever assembly 10 to pivot in a forward and rearward direction. (Pivot 25 is mounted on the frame 40 near footrest 23 shown in FIG. 1.) In FIG. 2, sleeve 2 is disposed for movement on the exterior of control lever assembly 10. Sleeve 2 has a plurality of grooved apertures which extend along the length of sleeve 2 and which may be positioned to overlap one or more of the grooved apertures 11 of the control lever assembly 10. In FIG. 2, each of the apertures on sleeve 2 overlaps a corresponding aperture 11 of control lever assembly 10.

Force conveyance connecter 3 in the form of a cable is affixed to clamp 4, which in turn is affixed to the bottom outside surface of sleeve 2. Grip 33 is affixed to the top outside surface of sleeve 2 and frictionally engages the outer surface of control lever assembly 10 during movement of sleeve 2 along control lever assembly 10. Grip 33 thereby prevents slippage of sleeve 2 which could result in a failure of sleeve 2 and control lever assembly 10 to engage in the manner described hereinafter.

Steering column 1 has a location pin 7 which extends horizontally from its outside surface and which may, through movement of the steering column 1, be positioned to engage simultaneously a grooved aperture of both the sleeve 2 and control lever assembly 10 and thereby lock the sleeve 2 at a fixed position along the control lever assembly 10. Maximum propulsive and anti-rollback forces, equating to a mechanical advantage as great as ten times or more, are translated through the axially mounted single direction engagement means by force conveyance connecter 3 when the wheelchair occupant depresses steering column 1 to engage sleeve 2 and control lever assembly 10 at a position closest to the footrest, i.e., closest to pivot 25. Steering column 1 engages steering wheel shaft 35 for steering through connection through flexible or universal joint 37.

Figure 3:
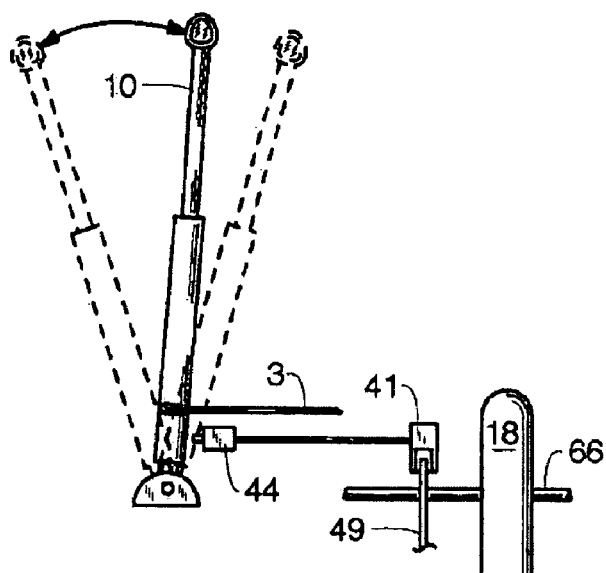
FIG. 3 illustrates control lever assembly propulsion and braking strokes.

Referring to FIG. 3, when control lever assembly 10 is pulled back from a vertical orientation by pivoting at pivot 25 it actuates brake actuation device 44 causing brake 41 to engage brake disc 49 and thereby apply a braking force on the rear drive wheel shaft 66. The occupant has two complementary braking systems at his disposal during the critical period of downhill movement and neither of these requires hand movement from one device to another. Rather, the occupant, by manipulation of steering column 1, and hence control lever assembly 10, can steer and brake. If needed, shifting seat 20 forward to activate the auxiliary braking system described previously in the discussion of FIG. 1 exerts an additional braking force.

Figure 4:
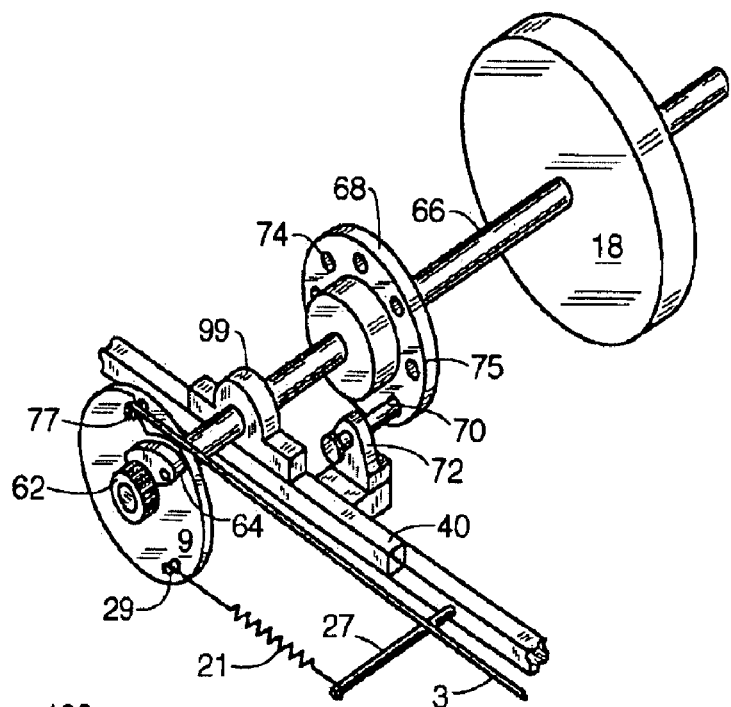
FIG. 4 illustrates a perspective view of a single direction engagement disc, wheel locking mechanism or anti-rollback mechanism, and force conveyance cable.

Referring to FIG. 4, rear drive wheel shaft 66 is secured for rotation relative to frame 40 by shaft fastener 99. Rear drive wheel 18 is axially mounted on rear drive wheel shaft 66. Mounting 72 is affixed to frame 40 and wheel locking or anti-rollback locking pin 70 extends through an aperture in mounting 72 for engagement and disengagement with apertures 74 of circumferentially apertured wheel locking or anti-rollback apparatus 68. Single direction rotating disc 9 is axially mounted on shaft 66 and comprises axially engaging ratchet 62 and claw 64, which engages ratchet 62 to ensure single direction rotation. Ratchet 62 and claw 64 are mounted for engagement on the outer face of single direction rotating disc 9. Force conveyance connecter 3 is also affixed to the outwardly facing portion of single direction rotating disc 9 by pin 77. Spring 21 is affixed at one end by fastener 27 to frame 40 and at the other end to single direction rotating disc 9 by fastener 29. The attachment of force conveyance connecter 3 and spring 21 to single direction rotating disc 9, and the engagement of ratchet 62 and claw 64, thereby enables the single direction rotating disc 9 to rotate to a fixed extent in a single direction during the forward propulsive stoke of control lever assembly 10 shown in FIG. 3. During such forward propulsive stroke, the propulsive force conveyed through force conveyance connecter 3 is translated through ratchet 62 to drive wheel shaft 66 and the vehicle is moved forward incrementally.

In operation in the normal anti-rollback mode, anti-rollback locking pin 70 engages an aperture 74 in anti-rollback apparatus 68 and anti-rollback apparatus 68, through resistive engagement with shaft 66, thereby inhibits rollback. When set for single direction movement by engagement of claw 64 and ratchet 62, single direction rotating disc 9 also enhances anti-rollback through its engagement with shaft 66 and its resistance to movement in a rearwards direction.

Figure 5:
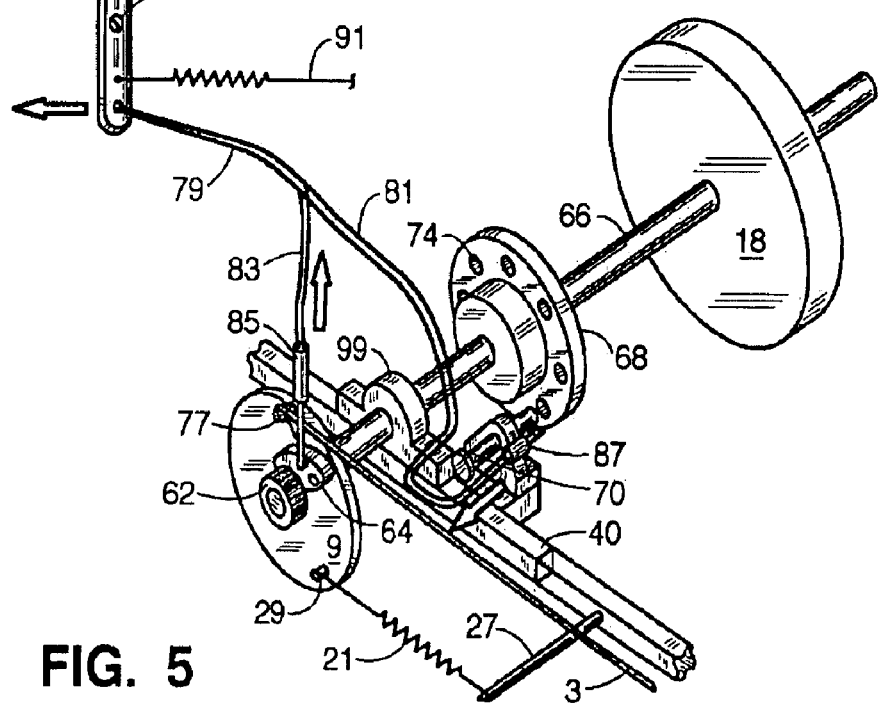
FIG. 5 illustrates a perspective view of a cable wheel locking mechanism or anti-rollback disengagement mechanism, single direction engagement disc and circumferentially apertured anti-rollback disc.

FIG. 5 illustrates the interconnection of the wheel locking or anti-rollback elements of FIG. 4 with a wheel locking mechanism or anti-rollback disengagement system including anti-rollback disengagement handle 102. Anti-rollback disengagement handle 102 has grip 100 on its top end and is pivotally mounted at pivot point 103 to frame 40 or to control lever assembly 10 (not shown in FIG. 5). Anti-rollback disengagement handle 102 is also engaged to frame 40 by return spring 91. Disengagement cable 79 is affixed at one end to the bottom of anti-rollback disengagement handle 102; disengagement cable 79 splits into, (1) claw disengagement cable 83 which is secured to claw 64 by fastening pin 85 and (2) anti-rollback disengagement cable 81 which is affixed to disengagement bar 87, which engages and disengages locking pin 70.

Figure 6:
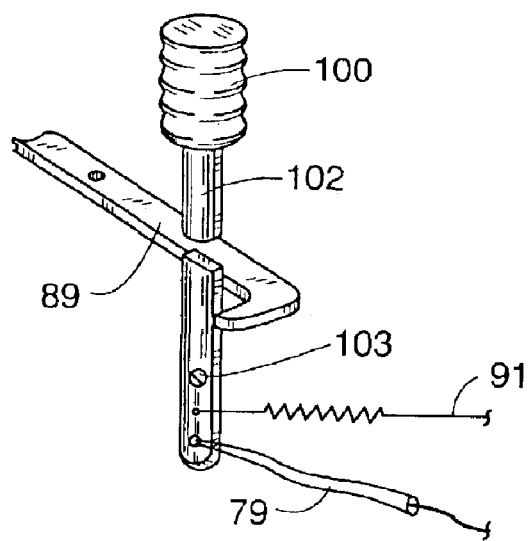
FIG. 6 illustrates a perspective view of a disengagement handle used in the mechanism illustrated in FIG. 5 and the engagement of such handle with a frame mounted locking tab.

As shown in FIG. 6, anti-rollback disengagement handle 102 is normally locked by locking tab 89 mounted on frame 40 or control lever assembly 10 (neither of which are shown in FIG. 6) in an upright position such that tension is exerted on return spring 91 which is affixed to frame 40. Releasing handle 102 from tab 89 and pulling back on handle 102 pulls disengagement cable 79 with the following result. Referring to FIG. 5, when disengaged from tab 89 (FIG. 6) and pulled back, handle 102 pulls disengagement cable 79 which disengages pin 85 from claw 64, allowing claw 64 to disengage from ratchet 62. Pulling back on handle 102 also pulls bar 87 and disengages locking pin 70 from an aperture 74 in wheel locking mechanism or anti-rollback apparatus 68. This mode of operation permits rollback and facilitates selective rearward movement in situations where temporary disengagement of anti-rollback means is desirable, for example, where a wheelchair occupant maneuvers the wheelchair onto and off of a lift. Also, it enables the occupant to selectively temper the propulsive force conveyed through the control assembly to optimize the vehicle's mode of motion.

Figure 7:
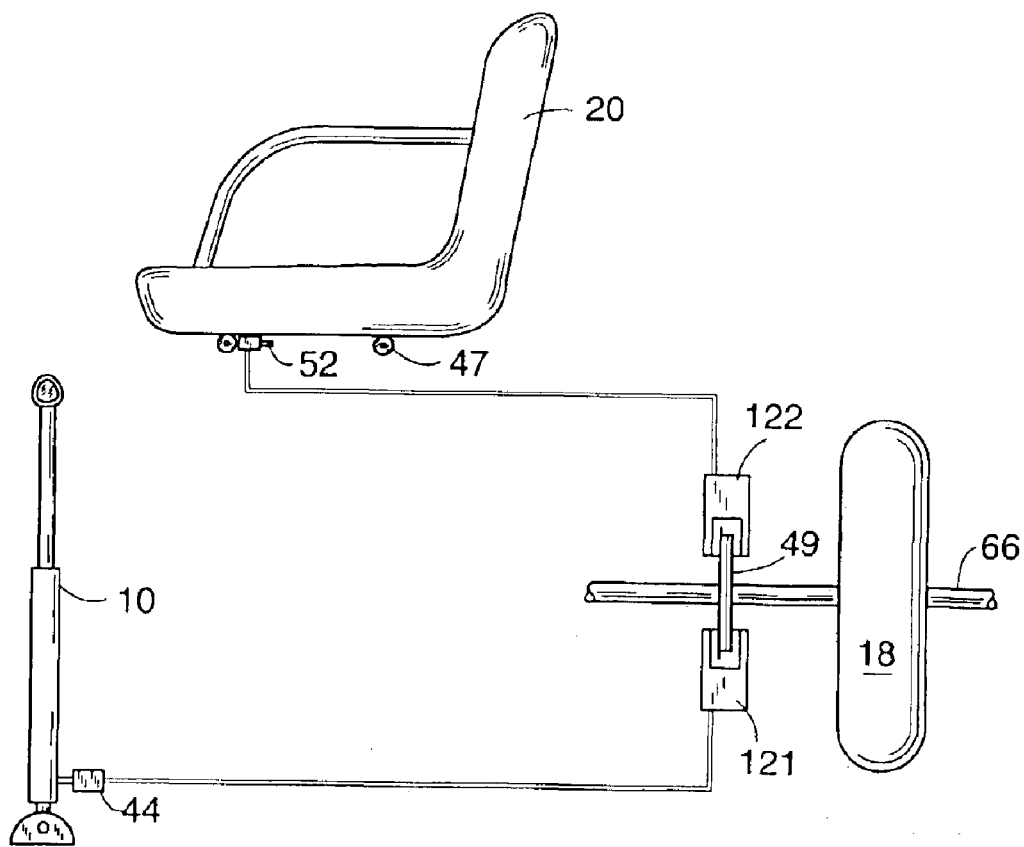
FIG. 7 illustrates a side view of a hydraulic seat-activated auxiliary braking system.

Referring to FIG. 7, seat 20 with wheels 47 is connected by connector 52 to hydraulic auxiliary brake actuation device 122. (The mounting of seat 20 with wheels 47 has been described previously in the discussion of FIG. 1.) Sliding seat 20 forward actuates brake actuation device 122 to engage brake disc 49 mounted for engagement to shaft 66. FIG. 7 also illustrates hydraulic actuation of brake actuation device 44 through movement of control lever assembly 10, and resultant engagement of hydraulic auxiliary brake actuation device 121 to brake disc 49 to apply a braking force to shaft 66.

Figure 8:
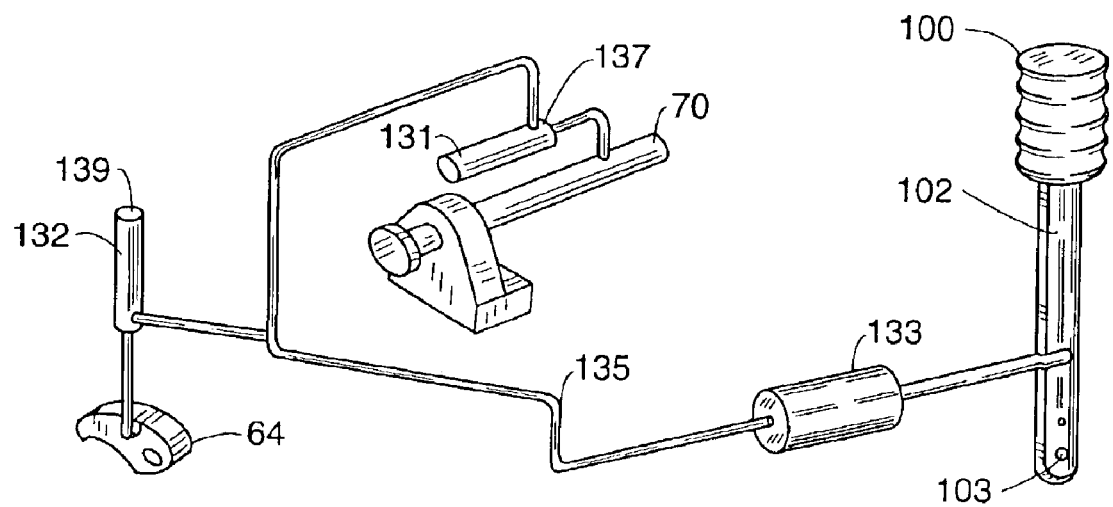
FIG. 8 illustrates a perspective view of a hydraulic wheel locking mechanism or anti-rollback disengagement mechanism.

In the illustrative embodiment shown in FIG. 8, anti-rollback disengagement handle 102 with pivot point 103 is hydraulically connected by actuator 133 and hydraulic linkage 135 to hydraulic cylinders 137 and 139. Actuation of cylinder 137 disengages locking pin 70 from an anti-rollback apparatus such as wheel locking mechanism or anti-rollback apparatus 68 illustrated in FIG. 5. Actuation of cylinder 139 disengages claw 64 from engagement with a ratchet such as ratchet 62 illustrated in FIG. 5. The system illustrated in FIG. 8 therefore provides a hydraulically actuated alternative to the wheel locking mechanism or cable anti-rollback disengagement system illustrated in FIG. 5. The system illustrated in FIG. 8 therefore provides a hydraulically actuated alternative to the cable wheel locking mechanism or anti-rollback disengagement system illustrated in FIG. 5.

Figure 9:
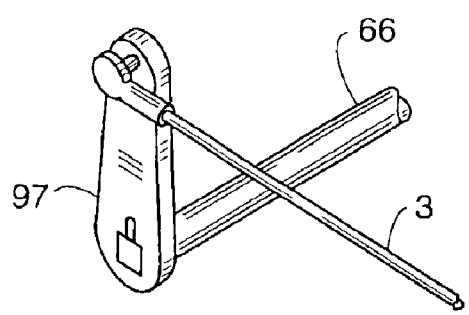
FIG. 9 illustrates a perspective view of a single direction engagement apparatus in the form of a ratchet drive connected to a force conveyance connecter in the form of a rigid rod.

FIG. 9 illustrates another embodiment in which force conveyance connecter 3 is in the form of a rigid rod, which is connected to a single direction engagement apparatus 97 in the form of single direction ratchet. Ratchet 97 engages shaft 66. Propulsive force is exerted by a force conveyance connecter 3 in the form of a rigid rod through single direction engagement apparatus 97 in the form of a single direction ratchet to the drive wheel shaft 66 in the manner described in the previous discussion of FIG. 1.

What is claimed is:

1. A propulsion, braking and steering control assembly for installation on a manually propelled vehicle, said vehicle comprising a frame, a front steering wheel assembly having at least two pivoting steering wheels having front steering wheel shafts, a rear drive wheel assembly comprising at least one drive wheel mounted for rotation on a rear drive wheel shaft, a single direction engagement apparatus axially mounted on said rear drive wheel shaft for translation of a propulsive force, an anti-rollback apparatus axially mounted on said rear drive wheel shaft and an axially mounted braking disc mounted on said shaft, said front steering and rear drive wheel assemblies supporting said frame and enabling movement of the vehicle, a footrest positioned within said frame above said front steering wheel assembly, said front steering wheel shafts being pivotally attached to the frame below the of said foot rest, and a seat constructed and oriented to support an occupant and mounted for limited horizontal sliding on the frame through roller and rail or linear bearing means, and a control assembly, said control assembly comprising:

(a) a control lever assembly which is pivotally mounted to the top of the footrest and which has a plurality of engagement sites which extend along its length, said control lever assembly being connected by a brake actuator to said braking disc;

(b) a sleeve which is disposed for movement on the exterior of the control lever assembly, said sleeve having a plurality of engagement sites which extend along the length of the sleeve and which may be positioned to overlap one or more of the engagement sites of the control lever assembly;

(c) a force conveyance connecter which is affixed at one end to the sleeve and at the other end to said single direction engagement apparatus; and (d) a rotating steering column which extends through and is disposed for movement within the control lever assembly, and which (i) engages and turns one of said front steering wheels through connection by a flexible joint to a front steering wheel shaft, and (ii) which has an engager which may, through movement of the steering column, be positioned to engage simultaneously an engagement site of both the sleeve and control lever assembly and thereby lock the sleeve at a fixed position along the control lever assembly, wherein, (1) an increasing propulsive force is translated from the force conveyance connecter through the single direction engagement apparatus to the rear drive wheel shaft by pushing the control lever assembly forward from a vertical position when said steering column has been adjusted to lock the sleeve in a position along the control lever assembly closer to the pivot mounting near footrest, (2) pulling the control lever assembly in a backwards direction from a vertical orientation applies a braking force to the drive wheel shaft, and (3) the vehicle may be steered through movement of the steering column during propulsion or braking.

2. The control assembly of claim 1, wherein the control lever assembly engagement sites and sleeve engagement sites are grooved apertures and the steering column engager is a pin which extends horizontally from the exterior of the steering column.

3. The control assembly of claim 2, wherein the force conveyance connecter is a rigid rod, cable or chain.

4. The control assembly of claim 1, wherein the anti-rollback apparatus comprises a circumferentially apertured disc mounted on the rear drive wheel shaft and wherein said disc is fixed in position by insertion of a locking pin through one of said apertures, said locking pin being mounted for insertion into and retraction from said apertures on a support affixed to the frame.

5. The control assembly of claim 1, further comprising a grip positioned at the top of the sleeve, said grip compressively engaging the outer surface of both the sleeve and control lever assembly to prevent slippage of the sleeve as the sleeve moves along the control lever assembly.

6. The control assembly of claim 1, wherein the brake actuator is a hydraulic actuator.

7. A manually propelled vehicle comprising:

a frame, a front steering wheel assembly having at least two pivoting steering wheels having steering wheel shafts, a rear drive wheel assembly comprising at least one drive wheel mounted for rotation on a rear drive wheel shaft, a single direction engagement apparatus axially mounted on said rear drive wheel shaft for translation of a propulsive force, an anti-rollback apparatus axially mounted for engagement on said rear drive wheel shaft, an axially mounted braking disc mounted on said shaft, said front steering and rear drive wheel assemblies supporting said frame and enabling movement of the vehicle, a footrest positioned within said frame above said front steering wheel assembly, said front steering wheel shafts being pivotally attached to the frame below the footrest, and a seat constructed and oriented to support an occupant and mounted for limited horizontal sliding on the frame, an auxiliary braking system actuated by sliding the seat along the frame, said auxiliary braking system comprising a lever pivotally mounted on the frame which is flexibly engaged to the bottom of the seat such that forward movement of the seat along the frame causes the lever to pivot and engage or disengage contact between braking pads rotationally mounted on the bottom of the lever and the rear drive wheel, and a control assembly, said control assembly comprising:

(a) a control lever assembly which is pivotally mounted to the frame near the footrest and which has a plurality of engagement sites which extend along its length, said control lever assembly being connected by a brake actuator to a rear drive wheel braking mechanism that engages the rear drive wheel shaft for braking;

(b) a sleeve which is disposed for movement on the exterior of the control lever assembly, said sleeve having a plurality of engagement sites which extend along the length of the sleeve and which may be positioned to overlap one or more of the engagement sites of the control lever assembly;

(c) a force conveyance connecter which is affixed at one end to the sleeve and at the other end to said single direction engagement apparatus; and (d) a rotating steering column which extends through and is disposed for movement within the control lever assembly, and which (i) engages and turns one of said front steering wheels through connection by a flexible joint to said front drive wheel shafts, and (ii) an engager which may, through movement of the steering column, be positioned to engage simultaneously an engagement site of both the sleeve and control lever assembly and thereby lock the sleeve at a fixed position along the control lever assembly wherein, (1) an increasing propulsive force is translated from the force conveyance connecter through the single direction engagement apparatus to the rear drive wheel shaft by pushing the control lever assembly forward from a vertical position when said steering column has been adjusted to lock the sleeve in a position along the control lever assembly closer to the pivot mounting near the footrest, (2) pulling the control lever assembly in a backwards direction from a vertical orientation applies a braking force to the drive wheel shaft, and (3) the vehicle may be steered through movement of the steering column during propulsion or braking.

8. The vehicle of claim 7, wherein the vehicle is a wheelchair, the control lever assembly engagement sites and sleeve engagement sites are grooved apertures, the seat is affixed to the frame by wheels fastened on the bottom of the seat, said wheels being mounted for horizontal movement along tracks on the top of said frame, the steering column engager is a pin which extends horizontally from the exterior of the steering column and the single direction engagement apparatus is a single direction rotating disc having a clutch and claw affixed to the disc outer face, said clutch being axially mounted for engagement with said rear drive wheel shaft, said claw engaging said clutch to ensure single direction rotation by said disc.

9. The vehicle of claim 8, wherein the force conveyance connecter is a cable, wire, chain or rigid rod.

10. The vehicle of claim 9, wherein the anti-rollback apparatus comprises a circumferentially apertured disc mounted on the rear drive wheel shaft, said disc being fixed in position by insertion of a locking pin through one of said apertures, said locking pin being mounted for insertion into and retraction from said apertures by means of a support affixed to the frame.

11. The vehicle of claim 10, wherein the control assembly further comprising a grip positioned on the sleeve, said grip compressively engaging the sleeve and hand control lever assembly to prevent slippage of the sleeve as the sleeve moves along the hand control lever assembly.

12. The vehicle of claim 10, further comprising a system for selectively engaging and disengaging the anti-rollback apparatus and the single direction engagement disc, said system comprising:

(a) a disengagement handle pivotally mounted on said frame at a position convenient for engagement by a vehicle occupant, said handle being locked in a vertical position relative to said frame when not in use by a locking tab mounted on the frame, said disengagement handle also being connected to the frame by a spring connected to the bottom of the handle; and (b) a disengagement cable connected at one end to the bottom of the disengagement handle and splitting at its other end to connect to two fasteners, the first of which is adapted to disengage and engage contact between the claw and the clutch, and the second of which is adapted to disengage and engage contact between the locking pin and an aperture in the anti-rollback apparatus, wherein, upon disengagement of the disengagement handle from the locking tab, the handle may be pulled back to pull the disengagement cable and thereby disengage contact between the claw and the clutch and disengage and engage contact between the locking pin and an aperture in the anti-rollback apparatus.

13. A manually propelled vehicle comprising:

a frame, a front steering wheel assembly having at least two pivoting steering wheels having steering wheel shafts, a rear drive wheel assembly comprising at least one drive wheel mounted for rotation on a rear drive wheel shaft, a single direction engagement apparatus axially mounted on said rear drive wheel shaft for translation of a propulsive force, an anti-rollback apparatus axially mounted for engagement on said rear drive wheel shaft, an axially mounted braking disc mounted on said shaft, said front steering and rear drive wheel assemblies supporting said frame and enabling movement of the vehicle, a footrest positioned within said frame above said front steering wheel assembly, said front steering wheel shafts being pivotally attached to the frame below the bottom of said footrest, and a seat constructed and oriented to support an occupant and mounted for limited horizontal sliding on the frame, an auxiliary braking system actuated by sliding the seat along the frame, said auxiliary braking system comprising a hydraulic piston connected to an auxiliary braking disc mounted on the rear drive wheel, said piston actuating the auxiliary braking disc when the seat slides forward, and a control assembly, said control assembly comprising:

(a) a control lever assembly which is pivotally mounted to the frame near the footrest and which has a plurality of engagement sites which extend along its length, said control lever assembly being connected by a brake actuator to a rear drive wheel braking mechanism that engages the rear drive wheel shaft for braking;

(b) a sleeve which is disposed for movement on the exterior of the control lever assembly, said sleeve having a plurality of engagement sites which extend along the length of the sleeve and which may be positioned to overlap one or more of the engagement sites of the control lever assembly;

(c) a force conveyance connecter which is affixed at one end to the sleeve and at the other end to said single direction engagement apparatus; and (d) a rotating steering column which extends through and is disposed for movement within the control lever assembly, and which (i) engages and turns one of said front steering wheels through connection by a flexible joint to said front drive wheel shafts, and (ii) an engager which may, through movement of the steering column, be positioned to engage simultaneously an engagement site of both the sleeve and control lever assembly and thereby lock the sleeve at a fixed position along the control lever assembly wherein, (1) an increasing propulsive force is translated from the force conveyance connecter through the single direction engagement apparatus to the rear drive wheel shaft by pushing the control lever assembly forward from a vertical position when said steering column has been adjusted to lock the sleeve in a position along the control lever assembly closer to the pivot mounting near the footrest, (2) pulling the control lever assembly in a backwards direction from a vertical orientation applies a braking force to the drive wheel shaft, and (3) the vehicle may be steered through movement of the steering column during propulsion or braking.

14. A manually propelled vehicle comprising:

a frame, a front steering wheel assembly having at least two pivoting steering wheels having steering wheel shafts, a rear drive wheel assembly comprising at least one drive wheel mounted for rotation on a rear drive wheel shaft, a single direction engagement apparatus axially mounted on said rear drive wheel shaft for translation of a propulsive force, an anti-rollback apparatus axially mounted for engagement on said rear drive wheel shaft, an axially mounted braking disc mounted on said shaft, said front steering and rear drive wheel assemblies supporting said frame and enabling movement of the vehicle, a footrest positioned horizontally within said frame above said front steering wheel assembly, said front steering wheel shafts being pivotally attached to the frame below the said footrest, and a seat constructed and oriented to support an occupant and mounted for limited horizontal sliding on the frame, said vehicle further comprising:

(a) auxiliary braking system which applies a braking force to the rear drive wheel shaft, said auxiliary braking system being actuated when the seat slides forward along the frame, (b) a control assembly mounted on the frame near the footrest for propulsion, braking and steering, said control assembly (i) conveying a propulsive force through a force conveyance connector to the rear drive wheel shaft when pushed forward, (ii) conveying a braking force through the force conveyance connector to the rear drive wheel shaft when pulled back, and (iii) being engaged for steering to a steering wheel shaft, and (c) an anti-rollback disengagement system mounted on the frame or the control assembly for selective disengagement of the single direction engagement apparatus and anti-rollback apparatus.

15. The vehicle of claim 14, wherein the vehicle is a wheelchair and the auxiliary braking system anti-rollback disengagement system are hydraulically activated.

16. The vehicle of claim 14, wherein the vehicle is a wheelchair, the auxiliary braking system is hydraulically activated and the force conveyance connecter is a cable, wire, chain or rigid rod.

17. The vehicle of claim 14, wherein the vehicle is a wheelchair, the auxiliary braking means comprise a lever connected to the seat, said lever having braking pads at its bottom end for engagement with a rear drive wheel, and the control assembly means includes a cable force conveyance connecter.

18. The vehicle of claim 14, wherein the control assembly comprises:

(a) a control lever assembly which is pivotally mounted to the top of the footrest and which has a plurality of engagement sites which extend along its length, said control lever assembly being connected by a brake actuator to said braking disc;

(b) a sleeve which is disposed for movement on the exterior of the control lever assembly, said sleeve having a plurality of engagement sites which extend along the length of the sleeve and which may be positioned to overlap one or more of the engagement sites of the control lever assembly; and (c) a force conveyance connecter which is affixed at one end to the sleeve and at the other end to said single direction engagement apparartus;

(d) a rotating steering column which extends through and is disposed for movement within the control lever assembly, and which (i) engages and turns one of said front steering wheels through connection by a flexible joint to a front steering wheel shaft, and (ii) which has an engager which may, through movement of the steering column, be positioned to engage simultaneously an engagement site of both the sleeve and control lever assembly and thereby lock the sleeve at a fixed position along the control lever assembly, wherein, (1) an increasing propulsive force is translated from the force conveyance connecter through the single direction engagement apparatus to the rear drive wheel shaft by pushing the control lever assembly forward from a vertical position when said steering column has been adjusted to lock the sleeve in a position along the control lever assembly closer to the pivot mounting near the footrest, (2) pulling the control lever assembly in a backwards direction from a vertical orientation applies a braking force to the drive wheel shaft, and (3) the vehicle may be steered through movement of the steering column during propulsion or braking.

19. The vehicle of claim 18, wherein:

(a) the single direction engagement apparatus is a single direction rotating disc having a clutch and claw affixed to the disc outer face, said clutch being axially mounted for engagement with said rear drive wheel shaft, said claw engaging said clutch to ensure single direction rotation by said disc; and (b) the anti-rollback apparatus comprises a circumferentially apertured disc mounted on the rear drive wheel shaft and wherein said disc is fixed in position by insertion of a locking pin through one of said apertures, said locking pin being mounted for insertion into and retraction from said apertures on a support affixed to the frame.

* * * * *